United States Patent [19]
Fisher et al.

[11] Patent Number: 5,009,249
[45] Date of Patent: Apr. 23, 1991

[54] VALVE FOR FLUID CONTAINER

[75] Inventors: John M. Fisher, Cuyahoga Falls, Ohio; David R. Young, Snohomish, Wash.

[73] Assignee: The B. F. Goodrich Company, Akron, Ohio

[21] Appl. No.: 509,692

[22] Filed: Apr. 16, 1990

[51] Int. Cl.$^5$ ............................................. F16K 31/143
[52] U.S. Cl. .................................... 137/495; 74/2; 74/500.5; 137/505.18; 222/3; 244/905; 251/74; 251/294; 441/41; 441/96
[58] Field of Search ............... 137/223, 495, 505.18, 137/484.02, 505.14, 505.15; 141/114; 222/3; 251/74, 294, 324, 325, 282; 244/905; 441/41, 92, 96; 74/2, 501 R

[56] References Cited

U.S. PATENT DOCUMENTS

| | | | |
|---|---|---|---|
| 2,853,263 | 9/1958 | Murray | 251/74 |
| 2,949,274 | 8/1960 | Heigis et al. | 251/74 |
| 3,165,763 | 1/1965 | Gaylord | 251/74 |
| 3,338,266 | 8/1967 | Zilka et al. | 137/219 |
| 3,702,623 | 11/1972 | Chacko | 244/905 |
| 3,709,044 | 1/1973 | Chacko | 251/74 |
| 3,710,820 | 1/1973 | Simpson Jr. | 137/495 |
| 3,782,413 | 1/1974 | Chacko | 251/74 |
| 3,818,921 | 6/1974 | Peczkowski | 137/505.18 |

*Primary Examiner*—George L. Walton
*Attorney, Agent, or Firm*—Joseph Januszkiewicz

[57] ABSTRACT

A pressure regulator for use in regulating the pressure of inflating an inflatable member from a high pressure source wherein a valve housing has one end attached to a pressure source and the other end attached to a trigger mechanism. A spool valve is slidably biased into contact with the trigger mechanism which in the locked condition retains the spool valve in an inoperative condition and prevents the flow of fluid from the pressure source to inflate the inflatable member. Upon actuation of the trigger mechanism the spool valve is first unseated from its inoperative condition by a first spring and thence placed into a pressure regulating condition by a second spring in opposition to the escaping fluid pressure acting on annular face of the spool valve.

9 Claims, 3 Drawing Sheets

VALVE FOR FLUID CONTAINER

BACKGROUND OF THE INVENTION

This invention relates to a pressure regulator and more particularly to a new and improved fluid pressure regulator used in inflation systems such as for the inflation of escape slides and other inflatables where the output pressure of the gas flow has a relatively low regulating pressure setting and the system remains dormant for extended periods of time. These two factors have made the problem more severe because the loading on the O-ring seals or seals places them under a substantial load and causes the relatively moving parts to stick and malfunction.

The present invention modifies fluid pressure regulators in a facile manner to obtain reliable functioning of the fluid pressure regulator valve, avoiding and assuring an immediate response even though such systems may be stored for extended periods of time and where periodic testing is extended. It has been the practice to use O-rings of rubber or other resilient material with this type of regulator. In order to prevent leakage the pressure applied by the O-rings is sufficiently high to assure non-leakage which exacerbates the ring sticking problem after being held in a static condition an appreciable length of time. The present invention provides a structure which eliminates this problem by providing two springs nested together wherein the one spring only functions to unseal the pressure regulator while the second spring provides the pressure regulating function.

SUMMARY OF THE INVENTION

The pressure regulator of this invention provides a housing for mounting onto a fluid container that stores pressurized fluids therein for use upon actuation of the pressure regulator to inflate at a controlled pressure inflatable members such as inflatable slides. The housing has a central bore with an enlarged bore portion that defines a chamber (low pressure chamber) and communicates directly with outlet means to the inflatable members. A regulator spool valve in the central bore is held inoperative under normal conditions by a trigger release means, but upon actuation places the regulator spool valve into operating conditions such that a piston on the spool valve which reflects the pressure being transferred by the fluids into the low pressure chamber in opposition to a first spring that biases the spool valve to its operative condition. The spool valve has a fluid transfer cavity means which defines a high pressure chamber which interconnects the pressurized fluid from the fluid container to the low pressure chamber and the inflatable member upon actuation of the spool valve. The fluid transfer cavity means has shoulder abutments that cooperate with the annular edge of the chamber to throttle and control the fluid transfer in accordance with the dictates of the piston and the first spring. A second spring nestled with the first spring is operative to solely place the spool valve into operating condition upon actuation of the pressure regulator.

DETAILED DESCRIPTION

Figure 1:
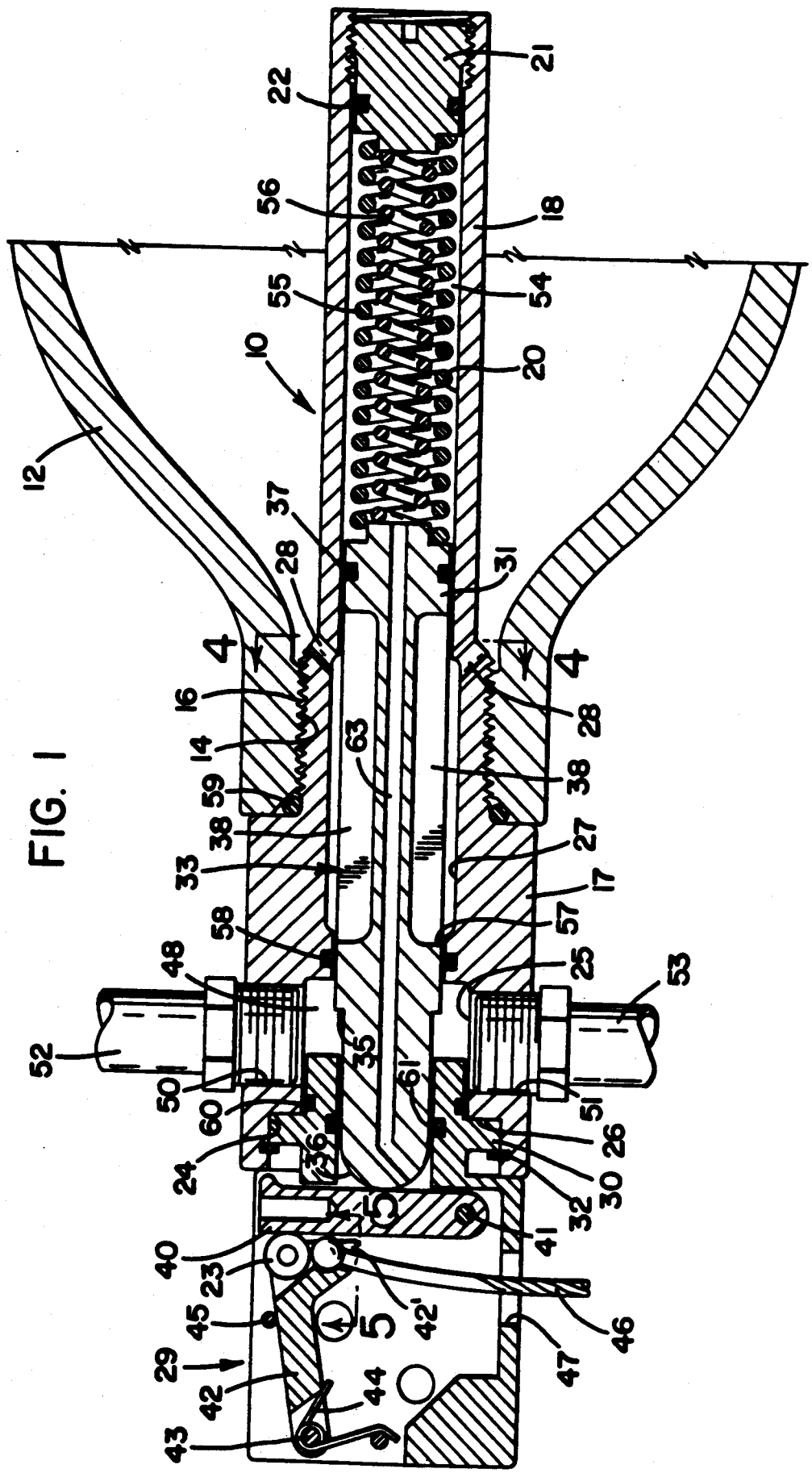
FIG. 1 is a sectional view of the fluid pressure regulator according to the present invention with a connection to a fluid container and interconnecting means to conduits which are connectable to inflatable members (not shown)
Figure 2:
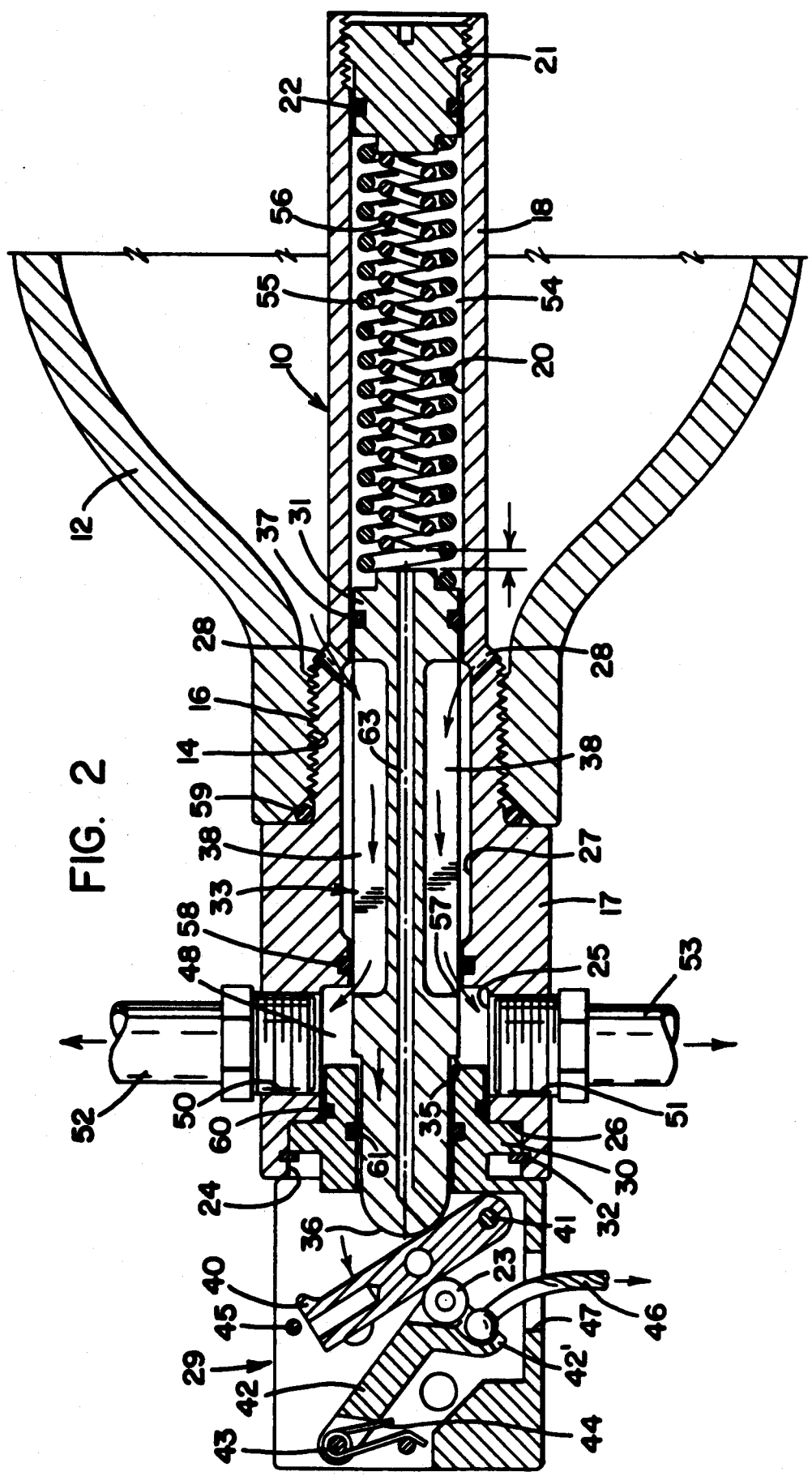
FIG. 2 is a sectional view of the fluid pressure regulator similar to FIG. 1 but with the spool valve in an actuated condition and the trigger mechanism actuated.
Figure 3:
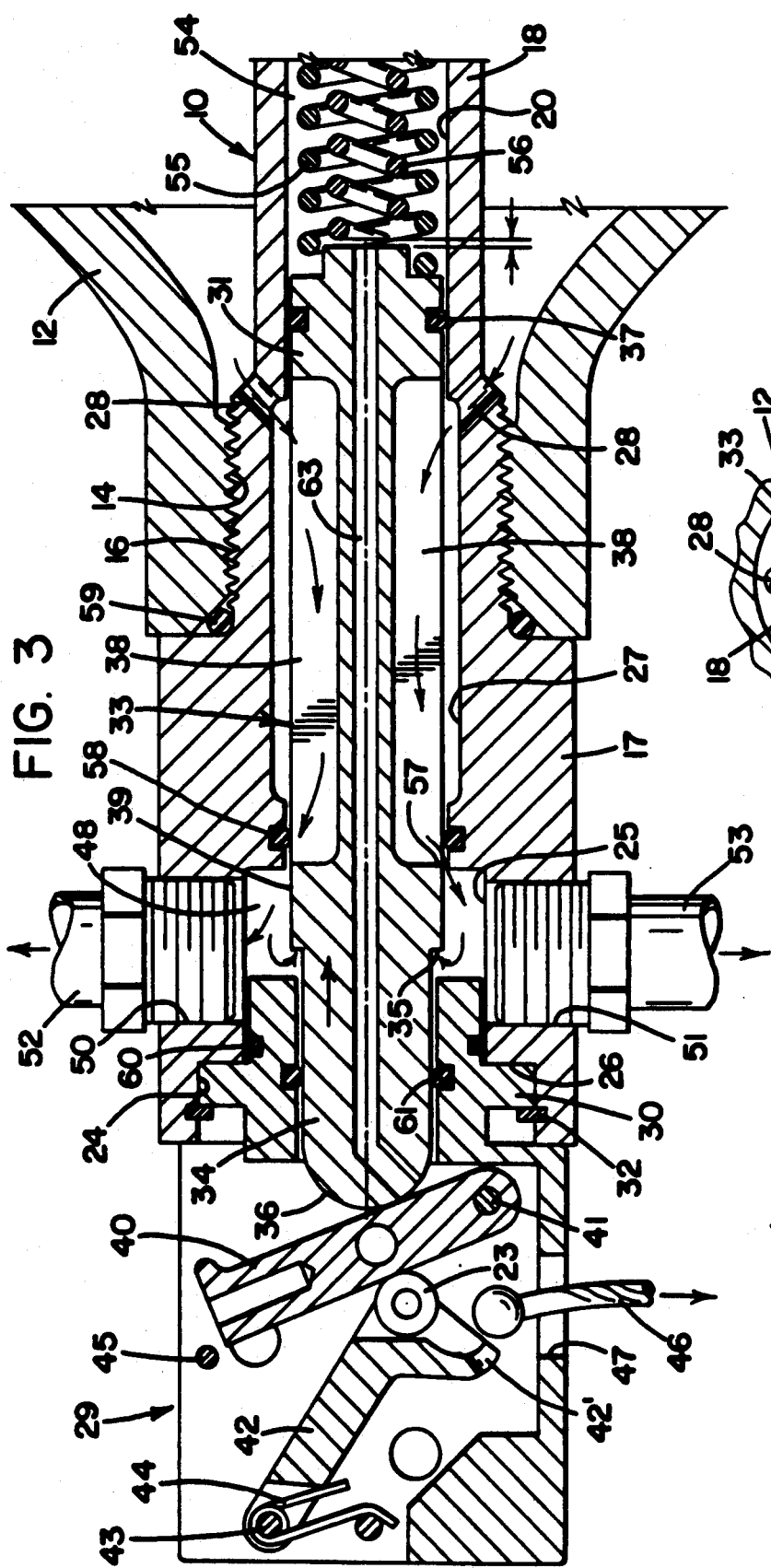
FIG. 3 is an enlarged sectional view of the fluid pressure regulator similar to FIG. 2 with the spool valve deployed to throttle the pressurized fluid.
Figure 4:
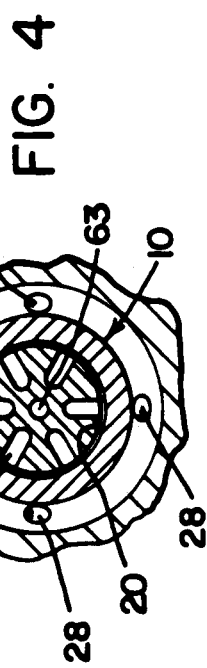
FIG. 4 is a cross-sectional view of the spool valve and the surrounding valve housing taken on line 4—4 of FIG. 1.

Referring to the drawings wherein like reference numerals identify like or corresponding parts throughout the several views, there is shown in FIGS. 1 through 3 a valve housing or housing 10 which may be a machined casting shown mounted on a pressure fluid container, storage tank or metal bottle 12 for storing gases at pressure as high as 3,000 pounds per square inch (210.92 kilograms per square centimeter). Such container 12 is a closed cylinder except for a threaded opening 14 at one end.

Valve housing or housing 10 is a generally longitudinally extending cylindrical body with an intermediate section having an externally threaded portion 16 that facilitates its threaded connection to the container or bottle 12. The one end of the valve housing 10 adjacent to the threaded portion 16 has a thicker wall portion defining a hub portion 17 while the other end portion of housing 10 has a thinner wall portion defining a tubular portion 18.

Valve housing 10 has a central longitudinally extending bore 20 that extends throughout the entire length thereof. The one end of bore 20 in the tubular portion 18 is threaded to receive a threaded plug 21. Plug 21 has an annular recess on its outer periphery to receive an annular seal 22.

The central bore of hub portion 17 has an enlarged bore portion 24 at the very end, and a second enlarged bore portion 25 (smaller in diameter than bore 24 but larger in diameter than bore 20). The juncture of bore portion 24 with bore portion 25 presents an annular shoulder 26. The intermediate portion of central bore 20 has a slightly larger diameter bore portion 27 whose one end communicates with the central chambers of pressurized container 12 via a plurality of circumferentially spaced passageways 28.

A trigger housing 29 is suitably connected to the hub portion 17 of valve housing 10 by having its one stepped cylindrical end portion projecting into bore portions 24 and 25 such as to present an annular flanged portion 30 seated on shoulder 26. The hub portion 17 of valve housing 10 has a pair of slotted recesses that communicate with the enlarged bore portion 24 to receive a U-shaped locking member 32 that bears against the flanged portion 30, which affixes the housing 29 to the hub portion 17 to make it integral therewith to define a housing means and allow assembly of thereof. Other means of attaching the trigger housing 29 to valve housing 10 may be used such as a threaded connection. Trigger housing 29 contains the trigger mechanism for the actuation of a spool valve 33 that is located within the central bore 20.

Spool valve 33 (FIG. 3) is a longitudinally extending cylindrical member having a forwardly disposed reduced end portion 34 defining an annular shoulder 35 which acts as a piston in a manner to be described. The terminal end 36 of reduced end portion 34 is hemispherical in shape. The other end portion 31 of spool valve 33 has an annular groove to receive an annular seal 37. Spool valve 33 has a plurality of circumferentially spaced longitudinally extending grooves to define pressure transfer passageways or cavities 38 which cavities cooperate with the wall of bore portion 27 to define a high pressure chamber since it is in communication with the pressurized container 12 via passageways 28 at all times. Such pressure transfer passageways 38 extend from the end portion 31 to an annular portion 39 that is adjacent to a chamber 48 to be defined.

Figure 5:
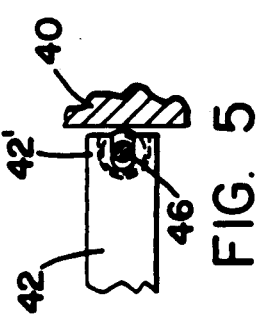
FIG. 5 is a fragmentary view of the head-end portion of the cam lever 42 taken on line 5—5 of FIG. 1.

Trigger housing 29 has a valve actuating lever 40 pivotally mounted about a pivot pin 41 in such housing and in its cocked position bears against the terminal end 36 of spool valve 33. To maintain and lock the actuating lever 40 in its cocked position, a cam lever 42 pivotally mounted on a pin 43 is biased by a spring 44 in a counterclockwise direction about pin 43 to bear against actuating lever 40 and spool valve 33. As seen in FIG. 1, once actuating lever 40 is in its vertical position as seen and depicted in FIG. 1 (directions being relative), which maintains the terminal end 36 of spool valve 33 fully within the bore 20 of valve housing 10, cam lever 42 is pivoted into its position to bear against that end of actuating lever 40 that is remote from pivot pin 41. In this condition of levers 40 and 42, the spool valve 33 remains locked within valve housing 10 since cam lever 42 has been moved in a counterclockwise direction where it is past dead center or the longitudinal axis of bore 20 to thereby retain levers 40 and 42 in their cocked position. Cam lever 42 is biased by spring 44 to move lever 42 in a counterclockwise direction, but further counterclockwise movement of lever 42 is prevented by the construction of trigger housing 29 and a pin 45 mounted in such housing. Pin 45 limits the counter-clockwise movement of cam lever 42 and retains the valve actuating lever 40 in its locked and cocked position. The end portion of cam lever 42 opposite the end portion that receives the pivot pin 43 is enlarged to define a head end portion, which head end portion is recessed to receive a roller 23 which facilitates its camming action on lever 40. Such head end portion of lever 42 has a bifurcated end 42' (FIG. 5) which receives the enlarged end portion of a lanyard in the form of a pull chain or cable 46 which cable 46 extends out through the slot of the bifurcated end 42' and through an opening 47 in trigger housing 29 and provides the means for actuating the trigger mechanism for spool valve 33. The lanyard may thus be detached from the cam lever 42 as the lanyard or cable 46 is pulled downwardly as viewed in FIGS. 1-3.

The enlarged bore portion 25 of central bore 20 in hub portion 17 receives only a portion of the one stepped cylindrical end of trigger housing 29 to thus define a low pressure chamber 48 in its cooperation with valve housing 10. Such hub portion 17 also has a pair of diametrically opposed threaded passageways 50 and 51 that defines outlet means that communicate chamber 48 with conduits 52 and 53 respectively for transferring pressurized gas or air from container 12 upon actuation of the spool valve 33 for pressurizing components of an inflatable slide (not shown) via pressure transfer cavities 38 in spool valve 33.

That portion of bore 20 between threaded plug 21 and the end portion 31 of spool valve 33 which defines a chamber 54 houses a pair of coil springs that are nested together, one being a first spring or an outer spring 55 and the other being a second spring or an inner spring 56. The end portion 31 of spool valve 33 is circumferentially recessed to provide a seat for the outer spring 55, which spring also has its other end seated on an annular seat on threaded plug 21. With inner spring 56 located within outer spring 55, the respective ends of spring 56 is guided for engagement with the end portion 31 of spool valve 33 and with the end portion of threaded plug 21. The inner spring 56 is coiled in the opposite direction from the coil of the outer spring 55 to eliminate any interference between their operation. The inner spring or boost spring 56 is stiff and is compressed only when the spool valve 33 is cocked such that its purpose is to provide a sufficient force to overcome the frictional force to breakaway the spool valve 33 from the O-ring seals or seals. As the spool valve 33 and its piston 35 approaches the position as depicted by FIG. 3 at which pressurized gas is released from the container 12 and flows into chamber 48, inner spring 56 has no contact with the spool valve 33 (and ceases to function) and only outer spring 55 has contact with the spool valve 33 and pressure regulation begins as determined by the pressure on piston 35 and the outer spring 55. FIG. 3 depicts the clearance space once inner spring 56 reaches its extreme position of movement once it initiates its reaction on spool valve 33. As depicted by FIG. 3, once the cable 46 has been pulled cam lever 42 is pivoted clockwise, permitting the respective springs 55 and 56 to move spool valve 33 outwardly against actuating lever 40 and pivoting it counterclockwise thereby releasing such lever 40 from influence on the spool valve 33. In this condition of spool valve 33, the pressurized gas from container 12 will flow via passageways 28, pressure transfer cavities 38 into chamber 48 while also acting on the piston or annular shoulder 35 as depicted by FIG. 3. As depicted by FIG. 3, valve housing 10 has an annular bore on its inner periphery of bore 20 between chamber 48 and pressure transfer cavities 38 to receive an annular seal 58 to facilitate the flow of fluids from the container 12 to chamber 48 once spool valve 33 is actuated. Pressure transfer cavities 38 have shoulders 57 on their one ends adjacent to the annular seal 58 that provides shoulder abutment means to help throttle and control the flow of pressurized fluid to chamber 48 in accordance with the linear position of the spool valve 33. As seen in FIG. 1, there is no flow of fluids, whereas FIG. 3 depicts a limited flow while FIG. 2 depicts a marked increase in the flow of fluids. The pressurized gas in chamber 48 flows via conduits 52 and 53 to pressurize the inflatable slides at a controlled rate. The pressured gas on piston 35 maintains piston 35 in a position to counteract the force of outer regulating spring 55. As the pressurized gas from container 12 falls, outer spring 55 moves the spool valve 33 further out into chamber 48 to allow a progressive increase in the volume of flow of the pressurized gas.

To assure the sealing of the respective elements of the spool valve and its mating parts as well as the movable parts, suitably O-rings or seals are placed at suitable locations. An O-ring 59 is located in a recess between the container 12 and the valve housing 10 adjacent to the threaded opening 14 and threaded portion 16. O-rings 60 and 61 (FIG. 3) are located in an outer circumferentially extending groove and an inner circumferentially extending groove in the annular flanged portion 30 of trigger housing 29.

Chamber 54 which is that portion of valve housing 10 between the threaded plug 21 and end portion 31 of spool valve 33 is vented to atmosphere via a passageway 63 (FIG. 3) extending centrally through spool valve 33 and communicating with the trigger housing 29 to prevent any build up of pressure which would otherwise affect the regulating function of spool valve 33.

While a certain representative embodiment and details have been shown and described for the purpose of illustrating the invention, it will be apparent to those skilled in the art that various changes and modifications other than those referred to may be made therein without departing from the spirit or scope of the invention.

We claim:

1. A pressure regulator for regulating the transfer of pressurized fluids at a controlled rate to an inflatable member comprising: a fluid pressurized storage means, a housing means mounted on said storage means, said housing means having a first chamber with an outlet means for connection to said inflatable member, said first chamber defining a low pressure chamber, a central bore in said housing means interconnecting said first chamber with said storage means, a regulator spool valve mounted in said central bore, said central bore cooperative with said spool valve to define a high pressure chamber, said spool valve in an inoperative condition to seal the flow of fluids from said storage means to said outlet means, said spool valve in an operative condition to communicate said storage means with said outlet means via said high pressure chamber, a trigger release means operatively connected to said spool valve, said trigger release means operative upon actuation to place said spool valve from said inoperative condition to said operative condition, a first spring in said bore operative solely upon actuation of said trigger means to assist said first spring and to bias said spool valve to interconnect said outlet means to said fluid storage means, and said spool valve having annular shoulder disposed in said low pressure chamber that is operative when said spool valve is in said operative condition to variably position said spool valve in opposition to said second spring to throttle the flow of fluids from said storage means to said outlet means in response to a change in fluid pressure at said outlet means.

2. A pressure regulator as set forth in claim 1 wherein said spool valve has fluid pressure transfer means that cooperates with the walls of said central bore to define said high pressure chamber to provide for the transfer of pressurized fluid from said storage means to said outlet means in the operative condition of said spool valve.

3. A pressure regulator as set forth in claim 2 wherein said fluid pressure transfer means includes a longitudinally extending cavity means with shoulder abutment means adjacent to said high chamber to cooperate therewith to effect said throttling.

4. A pressure regulator as set forth in claim 3 wherein said longitudinally extending cavity means present an effective pressure area that is equal to but opposite in disposition relative to the pressure area of said shoulder abutment means.

5. A pressure regulator as set forth in claim 1 wherein said spool valve has a plurality of circumferentially spaced fluid pressure transfer cavities that cooperates with the walls of said central bore to define said high pressure chamber to provide for the transfer of pressurized fluids from said storage means to said outlet means in the operative condition of said spool valve.

6. A pressure regulator as set forth in claim 5 wherein each fluid transfer cavity has a shoulder that is operative to effect said throttling of the flow of fluids into said outlet means in accordance with the position of said spool valve.

7. A pressure regulator as set forth in claim 6 wherein said first and second spring are nested together, and with one spring coiled opposite to the remaining one of said springs.

8. A pressure regulator consisting of a valve housing for mounting on a pressure fluid container, said valve housing having a central bore, one end of said bore being of greater diameter to define a low pressure chamber, said housing having an opening communicating with said low pressure chamber for delivering pressurized fluid from said low pressure chamber to inflatable members, a spool valve slidably mounted within said central bore, a trigger mechanism mounted on said valve housing adjacent to said one end of said bore, a pair of springs mounted in the outer end of said bore for biasing said spool valve into engagement with said trigger mechanism, said trigger mechanism locked in one position for restricting the outward movement of said spool valve by said springs, said trigger mechanism operative upon actuation to move said spool valve to a second variable position to render said spool valve responsive to said springs and pressure from fluid in said container, said spool valve having a fluid pressure transfer cavity means to define a high pressure chamber, said valve housing having a passageway for communicating said pressure transfer cavity means with the interior of the container on which said valve housing is mounted, said spool valve having an annular shoulder in said low pressure chamber that is responsive to the fluid pressure in said low pressure chamber to act on said spool valve when said spool valve is in a second position to variably position said spool valve in opposition to the force of one of said springs to effect a throttling of the pressurized fluid from said fluid container to said low pressure chamber in response to a change in fluid pressure in said low pressure chamber, and the other one of said springs is operative solely to unseat said spool valve upon actuation of said trigger mechanism.

9. A pressure regulator as set forth in claim 8 wherein said fluid pressure transfer cavity means includes a plurality of longitudinally extending cavities in said spool valve with opposing shoulders at the respective ends of said cavities to provide a balanced force on said spool valve.

* * * * *